United States Patent [19]

Neumann et al.

[11] 4,199,269
[45] Apr. 22, 1980

[54] SPIRAL MIXING ELEMENT

[75] Inventors: Jürgen Neumann, Liederbach; Peter Gumm, Glashütten, both of Fed. Rep. of Germany

[73] Assignee: Hoechst Aktiengesellschaft, Frankfurt am Main, Fed. Rep. of Germany

[21] Appl. No.: 907,340

[22] Filed: May 18, 1978

[30] Foreign Application Priority Data

May 26, 1977 [DE] Fed. Rep. of Germany ....... 2723727

[51] Int. Cl.² .............................................. B01F 7/08
[52] U.S. Cl. ................................. 366/343; 366/320; 366/321
[58] Field of Search ................ 366/338, 339, 343, 318, 366/319, 320, 321, 322, 324; 198/676, 657; 355/3 DD; 366/342, 323, 79, 88, 90; 415/72; 416/240

[56] References Cited

U.S. PATENT DOCUMENTS

| | | | |
|---|---|---|---|
| 1,286,674 | 12/1918 | Linville | 198/676 |
| 3,421,740 | 1/1969 | Behrens | 366/319 |
| 3,599,939 | 8/1971 | O'Brien | 366/321 |
| 3,947,939 | 4/1976 | Steiner | 366/318 |
| 4,113,371 | 9/1978 | Fraser | 355/3 DD |

FOREIGN PATENT DOCUMENTS 315260 8/1956 Switzerland .
907641 10/1962 United Kingdom .

*Primary Examiner*—Robert W. Jenkins
*Attorney, Agent, or Firm*—Schwartz, Jeffery, Schwaab, Mack, Blumenthal & Koch

[57] ABSTRACT

Disclosed is a device for mixing and/or conveying, in particular for mixing and conveying a developer composition in an electrophotographic copying machine. The device comprises an elongated member which is rotatable about its longitudinal axis, this member comprising a T-shaped lateral cross-section which has been spirally twisted about its longitudinal axis, whereby at least two portions of the T cross-section comprise helically extending mixing and/or conveying elements. Also disclosed is a method for manufacturing such a device.

13 Claims, 11 Drawing Figures

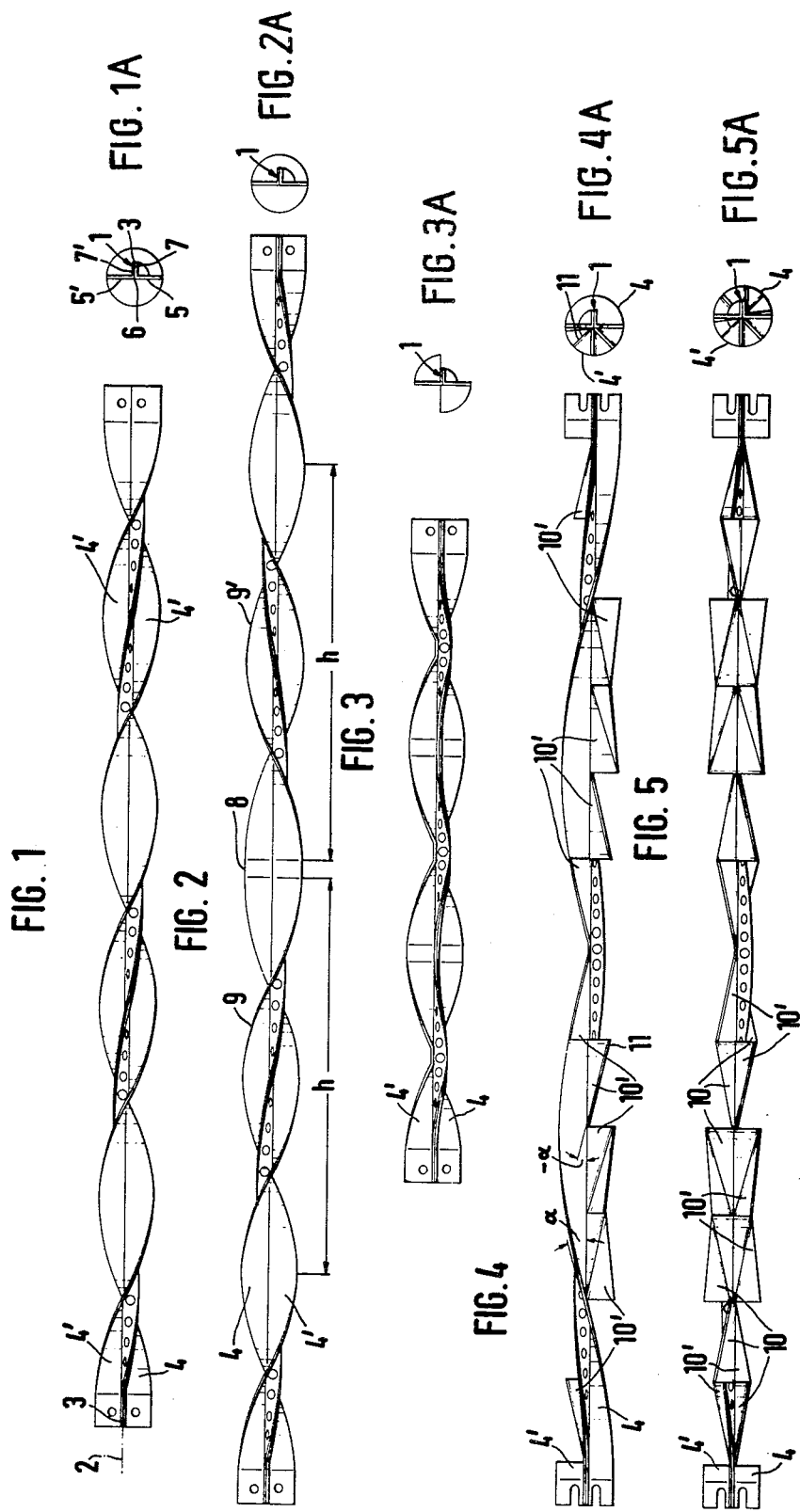

SPIRAL MIXING ELEMENT

BACKGROUND OF THE INVENTION

The present invention relates to a mixing device, and more especially to a device for homogeneously mixing and conveying a mixture, wherein the device is rotatable about its longitudinal axis and is provided with conveying elements distributed over its circumference. The invention also pertains to a method for the manufacture of a device of this type.

The device according to the invention is particularly adapted for use in electrophotographic copying machines, where it is employed for applying a pulverulent mixture composed of toner and carrier particles to a support material carrying a latent image. In this developing procedure, the toner particles are deposited in the electrically charged areas of the image, and following transfer to an image carrier they are fixed by fusing in a fixing station to render the image resistant to wiping.

The carrier particles do not adhere to the latent image and therefore are returned to a developer bin wherein a fresh developer mixture is prepared by replenishing the carrier with toner particles.

Various devices are known for applying the developer mixture in the above described manner and for simultaneously mixing the toner and carrier particles in a developer bin. For example, DE-OS No. 2,353,229 describes a circulating mechanism for a developer for electrostatic latent images, in which two transport rolls having blades mounted on their circumferences are disposed in a developer bin and rotate in opposite directions with respect to one another, in such a manner that the developer is, on the one hand, transported forward and backward in the longitudinal direction of the rolls and, on the other hand, is moved toward the recording medium by the roll which is disposed close to this medium. The blades of the transport rolls are arranged spirally over the circumferences of the rolls, thereby forming screws the pitch of which is variable in the direction of transport. This mechanism is expensive, because two transport rolls are used, and, above all, care has to be taken to ensure that the last and the first blades on each roll are in a particular position relative to the roll axles to avoid the formation of an increased pressure on the wall of the developer bin.

From DE-OS No. 2,437,389 a device is known for the uniform distribution of a developer employed in an electrophotographic copying machine. In this device a shaft is provided which carries a plurality of elliptical plates rotatable with the shaft and inclined relative to the axial direction of the shaft. When attaching the plates to the shaft, care has to be taken that the desired inclinations of the plates with respect to the axis of the shaft are adhered to. This design is particularly expensive in the event that the plates are individually welded to the shaft or are fastened by other means.

In U.S. Pat. No. 3,088,386 a mixing and distributing device is disclosed comprising two screws with blades. The two screws are identically designed, and they convey the developer mixture in opposite directions by rotating in opposite directions with respect to one another.

Similarly, DE-OS NO. 2,642,681 describes a device for mixing and feeding developer to a magnetic brush in an electrophotographic apparatus. The device consists of two screw conveyors arranged in parallel with the magnetic brush. These conveyors transport the developer in opposite directions and are connected at their end sections via reversing chambers. The two screw conveyors are positioned on the same level, lower than the magnetic brush roll. The excess developer trickling down from the magnetic brush drops back into one of the conveyor screws.

It is a disadvantage of the two last-mentioned devices that two screw conveyors are used, so that the space required is relatively large and, in addition, adequate arrangements must be made in order to prevent the developer mixture from piling up between the screw conveyors.

Japanese utility model application No. 6645/70 illustrates a device comprising a screw conveyor made up of two screws having opposite transport directions relative to one another. In this device, an accumulation of developer mixture may occur in the middle of the screw conveyor, thus causing a depletion of developer mixture at the ends of the conveyor. An accumulation of developer will also result in non-uniform mixing and irregular conveyance in the axial and radial directions.

In all of the known devices, no measures are taken to impart to them an adequate stiffness under flexure, even when these devices are used for large developing widths, for example, widths exceeding 300 mm.

SUMMARY OF THE INVENTION

It is therefore an object of the present invention to provide an improved mixing device.

It is a further object of the invention to provide an improved mixing device for mixing developer compositions in an electrophotographic copying machine.

Another object of the present invention resides in providing a device for homogeneously mixing and conveying a mixture, which uses a single shaft and prevents local piling up of the mixture, while at the same time ensuring a steady conveyance and uniform mixing in the axial and radial directions.

Still another object of the invention is the provision of a mixing device which possesses the above-recited advantages even in the case of large widths, without giving rise to bending of the conveying mechanism due to an insufficient stiffness under flexure.

In accomplishing the foregoing objects, there has been provided in accordance with the present invention a device for mixing and/or conveying, comprising longitudinal axis, this member comprising a T-shaped lateral cross-section which has been spirally twisted about its longitudinal axis, whereby at least two portions of the T cross-section comprise helically extending mixing and/or conveying elements. Preferably, the aforesaid two portions of the T cross-section comprise the two cross-webs extending from both sides of the base portion of the T.

In one embodiment of the invention, the mixing and/or conveying elements comprise a continuous one-piece design and are spirally twisted in the same direction over the entire length of the device. In a modification of this embodiment, the two halves of the T-shaped cross-section member are twisted in opposite directions with respect to one another, beginning from the middle of this member, or the direction of twisting changes at least once at predetermined distances in each half of the T-shaped cross-section member, beginning from the middle of this member.

In another embodiment of the invention, a first of the mixing and/or conveying elements comprises a continuous one-piece design and a second of the mixing and/or conveying elements is divided into a plurality of individual segments. According to yet another embodiment, two of the mixing and/or conveying elements are divided into a plurality of individual segments.

Also provided in accordance with the present invention is a method for manufacturing a device for homogeneously mixing and/or conveying, of the type defined above, comprising the steps of stationarily clamping at axially spaced positions an elongated member having a T-shaped cross-section, prestressing this member in the axial direction, and twisting the member to a predetermined pitch, whereby the member is cold formed.

The method for manufacturing a device for homogeneously mixing and conveying a mixture is advantageously characterized in that a T-section is used which is stationarily clamped and prestressed in axial direction and is cold formed by twisting it at a predetermined pitch. In detail, twisting of the T-section is each time started between two stationary clamping points, in mid-position of the part of the T-section lying between these clamping points.

The invention yields the advantages (1) that a single conveying mechanism of sufficient stiffness under flexure over large widths can be manufactured at low cost, because the T-sections used are conventional, commercially available, moderately priced structural members, and (2) that a very good local mixing in the axial and radial directions of the conveying mechanism is obtained while at the same time local accumulations of the mixture are prevented.

Further objects, features and advantages of the invention will become apparent from the detailed description of preferred embodiments which follows, when considered in light of the attached figures of drawing.

BRIEF DESCRIPTION OF THE DRAWINGS

In the drawings:

FIG. 1 is an elevational view of a first embodiment of the device, which is continuously twisted;

FIG. 1A is an end view of the embodiment of FIG. 1;

FIG. 2 is an elevational view of a further embodiment of the device comprising two halves which, starting from mid-length of the device, are twisted in opposite directions relative to one another;

FIG. 2A is an end view of the embodiment of FIG. 2;

FIG. 3 is an elevational view of still another embodiment in which, in contrast to the embodiment according to FIG. 2, twisting at 90° to the right is followed by twisting at 90° to the left, as viewed in the axial direction;

FIG. 3A is an end view of the embodiment of FIG. 3;

FIG. 4 is an elevational view of an embodiment in which one of the conveying elements of the device is divided into individual segments;

FIG. 4A is an end view of the embodiment of FIG. 4;

FIG. 5 is an elevational view of an embodiment in which both conveying elements of the device are divided into individual segments;

FIG. 5A is an end view of the embodiment of FIG. 5; and

DETAILED DESCRIPTION OF PREFERRED EMBODIMENTS

Figure 6:
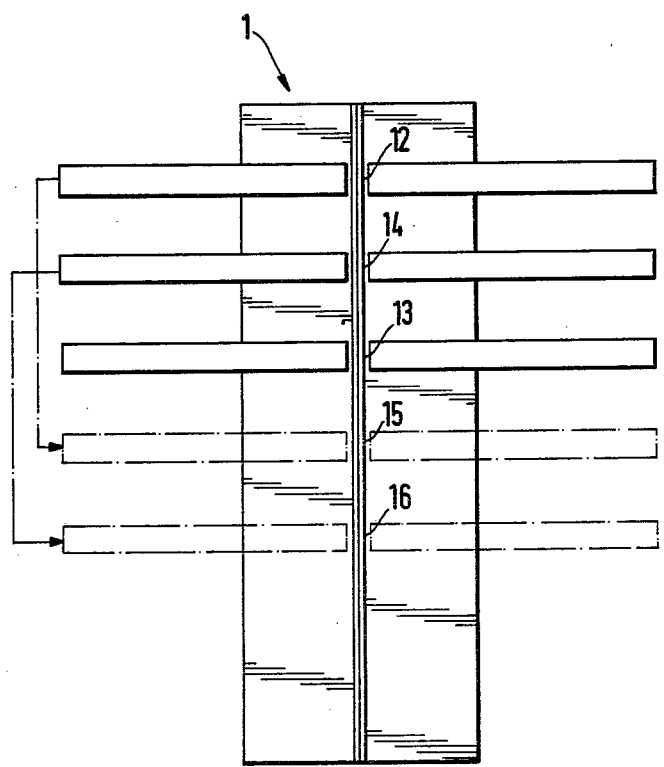
FIG. 6 is a schematic view of twisting of the T-section for the manufacture of the conveying mechanism according to the invention.

The basic element of the embodiments of the conveying mechanism according to the invention is a T-section 1 which may, for example, be made up of two angle sections 5,5' spot welded along joining surfaces 7,7'. (FIG. 1A). The T-section may also be assembled of two angle sections 5,5' which are seam welded along a common joining edge 6 of the angle sections. In addition, it is also possible to roll a T-section 1 from a single plate or sheet. The angle sections 5,5' are commercially available L-shaped sections.

The device comprises a T-section 1 of this type which is spirally twisted about its longitudinal axis 2, as shown in FIG. 1. The webs or sides of the T-section 1 form the conveying elements 4,4' which, as a result of twisting, extend helically in the direction of the longitudinal axis of the device.

In the embodiment according to FIG. 1, these conveying elements 4,4' are of a continuous one-piece design and are twisted in the same direction over the entire length of the device. The base portion 3 of the T-section 1 which is either formed by rolling a plate or by spot welding or seam welding the joining faces of the two angle sections 5,5' is shorter than the webs extending on either side of it.

In the embodiments according to FIGS. 2 and 3, twisting is performed in sections which each have alternating directions of twisting, so that the device comprises successive right hand and left hand sections of the conveying elements 4,4', which transport the mixture axially in different directions in the individual sections.

In the embodiment according to FIG. 2, the two halves 9,9' of the device are twisted in opposite directions with respect to one another, starting from a position in the middle 8 of the length of the T-section. In addition, the direction of twisting may change in each half 9,9' of the T-section 1 at predetermined distances, for example, at distances of 1½ times the course of thread h. In the embodiment according to FIG. 3, the direction of twisting changes following an angle of rotation of 90° toward the left and then turns at 90° toward the right, so that right hand and left hand sections of the conveying elements 4,4' alternate, following each quarter turn, as viewed in the axial direction of the T-section 1 in FIG. 3A.

The embodiments shown in FIGS. 4 and 5 are twisted in the same direction over the entire length of the T-section 1. In the embodiment according to FIG. 4, for example, one of the conveying elements 4' is provided with equidistant incisions prior to twisting, so as to divide the conveying element 4' into individual segments 10' which have the shape of triangular fins and are bent outwardly prior to twisting. After the twisting operation the individual segments 10' of this conveying element 4' are inclined in opposite directions, whereas the second conveying element 4 extends continuously in one piece. The angle of inclination α of one leg 11 of an individual segment 10' is, in this case, equal to the negative angle of inclination of the top edge of the continuous, one-piece conveying element 4. The top edge of the angular surface extends in parallel with the top edge of the twisted profile at the back. This design of the device ensures that the mixture is particularly advantageously conveyed axially in directions which are opposite relative to one another, so that a very favorable axial mixing takes place, together with an equally favorable radial mixing. Local accumulations of the mixture do not occur.

In the embodiment according to FIG. 5, the two conveying elements 4,4' are divided into individual segments 10,10', each of which is bent to form a triangular fin. In this case, twisting may be omitted or a slight twisting only may be provided.

It is obvious that, as a result of twisting the T-section 1, a very high stiffness under flexure of the device is obtained by simple means, so that it is possible to thoroughly mix and convey the mixture over widths of 600 to 700 mm and above without difficulty. The pitch of one course of thread h may amount to up to 220 mm and is preferably about 40 mm.

FIG. 6 is a schematic representation of the arrangement used for twisting the T-section 1 when a device according to the invention is to be manufactured. For this purpose, the straight T-section 1 is first stationarily clamped and prestressed in the axial direction between two stationary clamping points 12 and 13. Prestressing may be in the range of 2000 to 5000 Newton. Subsequently, twisting is commenced at mid-position 14 between the two stationary clamping points 12 and 13 using a suitable tool. Since, due to the prestressing in the longitudinal direction of the T-section 1, the edges of the conveying elements 4,4' are lengthened during twisting, the outsides of the conveying elements 4,4' are cold formed and, as a consequence, a particularly high stiffness under flexure is obtained. As soon as one section of the T-section is twisted, the tools at clamping points 12 and 14 are released and fastened again at the new clamping points 15 and 16 along the T-section 1. The tools at clamping points 13 and 16 are clamped again so as to prestress the material as mentioned above, and the next section of the T-section 1 is twisted by means of the tool positioned at clamping point 15. The entire length of the T-section 1 is twisted according to this procedure, in which the pitch h as well as the clamping and prestressing forces may be chosen in accordance with the requirements and with the material used for the manufacture of the device.

What is claimed is:

1. A device for mixing and/or conveying, comprising an elongated member which is rotatable about its longitudinal axis, said member comprising a T-shaped lateral cross-section which has been spirally twisted about said longitudinal axis, whereby at least two portions of the T cross-section comprise helically extending mixing and/or conveying elements, said two portions of the T cross-section comprising the two cross-webs extending from both sides of the base portion of the T, and the pitch of one course of thread amounting to up to 220 mm.

2. The device according to claim 1, wherein said mixing and/or conveying elements comprise a continuous one-piece design and are spirally twisted in the same direction over the entire length of the device.

3. The device according to claim 1, wherein the base portion of the T-shaped cross-section is shorter than the cross-webs extending on either side of the base.

4. The device according to claim 1, wherein the T-shaped cross-section comprises an integrally formed section from a single web of material.

5. The device according to claim 1, wherein the T-shaped cross-section comprises two angle sections seam welded along a joining edge of the two angle sections.

6. The device according to claim 1, wherein the T-shaped cross-section comprises two angle sections spot welded along their respective joining surfaces.

7. The device according to claim 1, wherein the two halves of the T-shaped cross-section member are twisted in opposite directions with respect to one another, beginning from the middle of said member.

8. The device according to claim 1, wherein the direction of twisting changes at least once at predetermined distances in each half of the T-shaped cross-section member, beginning from the middle of said member.

9. The device according to claim 8, wherein the direction of twisting changes at distances of about 1½ times the course of thread resulting from said twisting.

10. The device according to claim 8, wherein said twisting change comprises a first twisting at 90° to the right, followed by a second twisting at 90° to the left as viewed in the direction of the longitudinal axis of the T-shaped cross-section member.

11. The device according to claim 1, wherein a first of said mixing and/or conveying elements comprises a continuous one-piece design and a second of said mixing and/or conveying elements is divided into a plurality of individual segments.

12. The device according to claim 11, wherein said individual segments are triangular shaped and the angle of inclination of one leg of each individual segment is equal to the negative angle of inclination of the top edge of said continuous one-piece mixing and/or conveying element, with respect to the axis of said member.

13. The device according to claim 1, wherein two of said mixing and/or conveying elements are divided into a plurality of individual segments.

* * * * *